United States Patent
Kieffer et al.

(10) Patent No.: US 7,150,199 B2
(45) Date of Patent: Dec. 19, 2006

(54) FOIL STRAIN GAGE FOR AUTOMATED HANDLING AND PACKAGING

(75) Inventors: Thomas Patrick Kieffer, Wake Forest, NC (US); Robert Barry Watson, Clayton, NC (US); Sharon Lee Karcher Harris, Raleigh, NC (US)

(73) Assignee: Vishay Intertechnology, Inc., Malvern, PA (US)

( * ) Notice: Subject to any disclaimer, the term of this patent is extended or adjusted under 35 U.S.C. 154(b) by 107 days.

(21) Appl. No.: 10/958,545

(22) Filed: Oct. 5, 2004

(65) Prior Publication Data

US 2005/0039539 A1    Feb. 24, 2005

Related U.S. Application Data

(63) Continuation-in-part of application No. 10/368,922, filed on Feb. 19, 2003, now abandoned.

(51) Int. Cl.
*G01F 1/00* (2006.01)
(52) U.S. Cl. .......................................................... 73/777
(58) Field of Classification Search ................ 257/738; 338/2; 29/610; 73/862, 623, 593, 777
See application file for complete search history.

(56) References Cited

U.S. PATENT DOCUMENTS

| | | |
|---|---|---|
| 3,077,813 A | 2/1963 | Zandman |
| 3,263,199 A | 7/1966 | Zandman |
| 3,445,168 A | 5/1969 | Zandman |
| 3,601,744 A | 8/1971 | Zandman |
| 3,609,624 A | 9/1971 | Nagy |
| 3,782,182 A | 1/1974 | Starr |
| 4,307,371 A * | 12/1981 | Ort ................................ 338/2 |
| 4,310,823 A * | 1/1982 | Rucker et al. ................. 338/2 |
| 4,418,326 A | 11/1983 | Delapierre |
| 5,328,551 A | 7/1994 | Kovacich |
| 5,404,124 A | 4/1995 | Ruppin |
| 5,508,676 A | 4/1996 | Grange et al. |
| 5,780,746 A | 7/1998 | Brady |
| 6,444,487 B1 | 9/2002 | Boggs |
| 6,477,904 B1 | 11/2002 | Maeda |
| 6,501,176 B1 * | 12/2002 | Jackson ....................... 257/738 |
| 2004/0027228 A1 * | 2/2004 | Stevens ....................... 338/82 |
| 2004/0159162 A1 | 8/2004 | Kieffer et al. |
| 2005/0163461 A1 | 7/2005 | Ziebart et al. |

FOREIGN PATENT DOCUMENTS

| | | |
|---|---|---|
| EP | 1 197 737 A1 | 4/2002 |
| FR | 2 867 275 A1 | 3/2004 |
| GB | 2 234 629 A | 2/1991 |
| GB | 2 360 361 A | 9/2001 |

* cited by examiner

*Primary Examiner*—Jewel Thompson
(74) *Attorney, Agent, or Firm*—McKee, Voorhees & Sease, P.L.C.

(57) ABSTRACT

An improved strain gage and an improved manufacturing method are disclosed. The strain gage includes a semi-rigid substrate having a thickness of 3 to 30 mils, a resistive strain sensitive foil bonded to the semi-rigid substrate for providing a resistance varying with strain associated with a surface to which the strain gage is attached, a first and a second terminal operatively connected to the resistive strain sensitive foil, and an anti-static layer. The improved strain gage allows for reduced labor content in manufacturing by allowing use of modern automated electronic component manufacturing equipment.

16 Claims, 1 Drawing Sheet

FOIL STRAIN GAGE FOR AUTOMATED HANDLING AND PACKAGING

CROSS-REFERENCE TO RELATED APPLICATIONS

This application is a continuation-in-part of U.S. Ser. No. 10/368,922, filed Feb. 19, 2003 now abandoned herein incorporated by reference in its entirety.

BACKGROUND OF THE INVENTION

The present invention relates to strain gages. A strain gage is a strain sensitive resistive device used to measure mechanical strain. A strain gage is typically adhesively bonded to a surface and then measured changes in the resistance of the strain gage are associated with various effects depending upon the configuration of the strain gage. Strain gages can be used to measure bending, axial and torsional load or other strain effects. A strain gage is made of a resistive foil which is typically photoetched, ion milled, or otherwise cut to form a pattern to produce a resistance. Foil material is usually a Cu—Ni or Ni—Cr alloy of 50 microinches to 200 microinches in thickness. A typical resistance value associated with a strain gage is 120 ohms. The foil pattern is usually bonded to a very thin flexible polymer backing with an epoxy or similar resin or other cement. The polymer backing is thin (0.5 to 1.0 mils) to enhance flexibility. Such a device is strain sensitive according to the formula:

$$k_r \frac{dl}{l} = \frac{dr}{r}, \text{ where } \frac{dl}{l}$$

is strain imposed on the gage when it is cemented to a structure under load (stress), $$\frac{dr}{r}$$

is the relative resistance change due to the strain, and k is a constant. The constant k of the strain gage is the proportionality factor between the relative change of the resistance and strain in the gage. Sometimes k is called the gage factor. The constant k is typically approximately 2 for foil materials such as Cu—Ni or Ni—Cr.

Since the strain gage is very flexible, it can be applied to curved surfaces of very small radius. Because the gage is very flexible and "sticky" from static charge, it presents certain severe disadvantages.

One problem with a prior art strain gage relates to labor content in final manufacturing steps including:
1. Resistance checking,
2. Optical inspection, and
3. Packaging Prior art strain gages are typically packaged manually in tray pockets or plastic folders, resulting in cumbersome and costly handling requirements.

In other electrical component industries, use of automation is prevalent. As an example, modern electronic components are constructed to take advantage of automated systems utilizing vibrating bowl sorting equipment, which include automated resistance checking, optical inspection steps, and final tape and reel packaging.

The present invention attempts to improve upon the state-of-art by describing a strain gage capable of utilizing existing modern automated equipment commonly used in the electronic component industry, without significant performance reduction.

A further problem is that such a prior art strain gage is fragile during handling by hand or machine.

Yet another problem is that strain gages are difficult to install. Strain gages are cemented to the structure for which strain is measured. Electrical lead attachments must be made and generally such handling requirements create inconvenience and cost. Therefore, it is a primary object of the present invention to improve upon the state of the art.

It is another object of the present invention to provide a strain gage that can be automatically sorted and packaged on a tape.

Yet another object of the present invention is to provide a strain gage that need not be individually packaged.

A further object of the present invention is to provide a strain gage that is robust and easier to handle.

A still further object of the present invention is to provide a strain gage that is conducive to easy installation.

One or more of these and/or other objects, features, or advantages of the present invention will become apparent from the description and claims that follow.

SUMMARY OF THE INVENTION

The present invention provides for a strain gage that is simpler to manufacture, handle and install. The strain gage includes a semi-rigid substrate having a thickness of 3 to 30 mils and a resistive strain sensitive foil bonded to the semi-rigid substrate, and a first and a second terminal operatively connected to the resistive foil. The resistive foil and semi-rigid substrate and their geometrical relationship are selected to provide a strain sensitivity greater than 50 percent of the strain sensitivity of the resistive foil. Because a semi-rigid substrate is used, the strain gage is easier to handle and to install.

The strain gage can include an anti-static layer attached to a surface of the semi-rigid substrate which further makes the strain gage conducive to handling. The anti-static layer also facilitates soldering the strain gage to a metal part.

According to another aspect of the present invention, a method of performing the final strain gage manufacturing steps is provided, which greatly reduces manufacturing labor content over prior art. The method takes advantage of modern automated equipment with resistance checking, optical inspection, and tape and reel packaging commonly employed when manufacturing electronic components. Prior art strain gages are not compatible with such modem automated equipment because they are fragile and susceptible to clinging caused by static electricity.

DETAILED DESCRIPTION OF THE INVENTION

The present invention relates to strain gages. In particular, the present invention relates to providing a strain gage that is semi-rigid and not flexible in order to avoid the disadvantages of the prior art. The strain gage of the present invention is suitable for use on flat or slightly curved surfaces and provides advantages in ease of manufacturing and installation.

The strain gage includes the same type of serpentine resistive foil pattern associated with prior art strain gages, but the foil pattern is bonded to a semi-rigid substrate made of fiberglass, or polyimide resin, or other stiff material 3 mils to 30 mils in thickness. Substrate stiffness is a function of material modulus of elasticity (E) and thickness (t). The sensitivity of the strain gage to strain, k, remains greater than 50 percent of the strain sensitivity of the resistive foil despite the thickness and rigidity of the device. For example:

1. For resistive foil composed of Cu—Ni or Ni—Cr with a normal strain sensitivity, k, of approximately 2, the strain sensitivity for the invention is greater than 1.

2. For resistive foil composed of Pt—W with a normal strain sensitivity, k, of approximately 4, the strain sensitivity for the invention is greater than 2.

3. For semi-conductive resistive materials with normal strain sensitivity, k, of approximately 150, the strain sensitivity for the invention is greater than 75.

Figure 1:
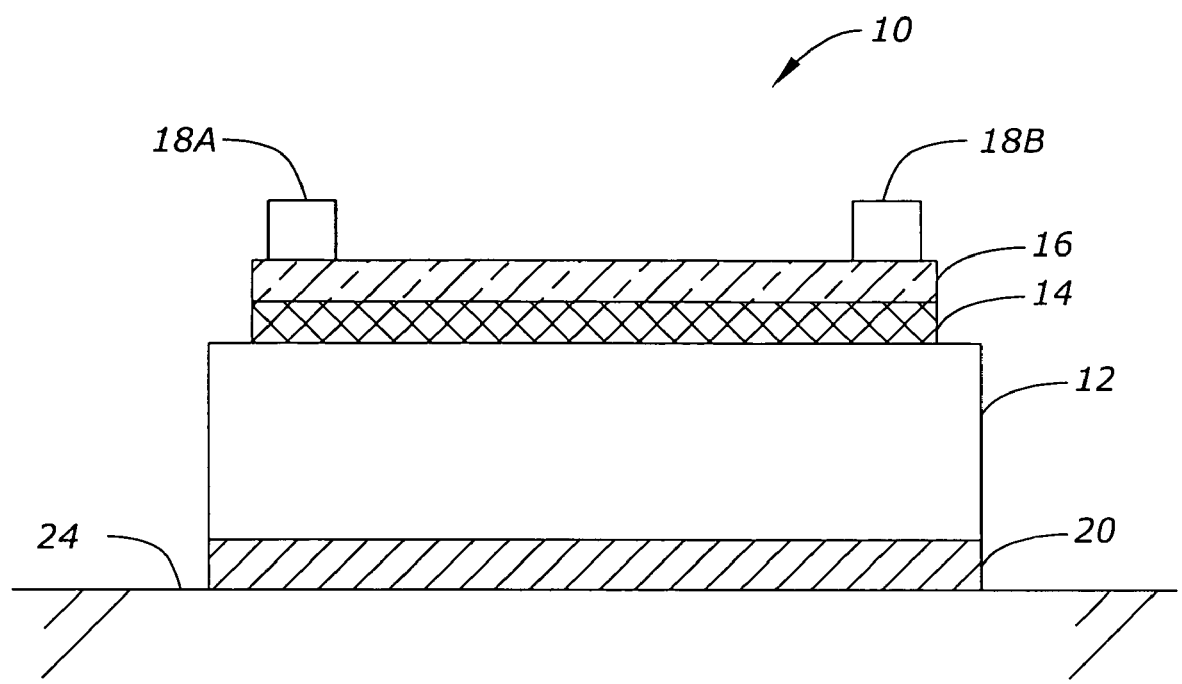
FIG. 1 is a front view of a strain gage according to one embodiment of the invention.

As shown in FIG. 1, a strain gage 10 includes a substrate 12. The substrate 12 is a semi-rigid substrate as opposed to being a flexible substrate of the prior art. The present invention contemplates that various materials can be used, including fiberglass, plastic, glass, reinforced epoxy, polyimide, ceramic, steel, aluminum or other stiff or semi-rigid material. The thickness of the substrate is 3 to 30 mils. The thickness of the substrate is therefore sufficiently great that the substrate remains semi-rigid. To achieve necessary substrate rigidity, a greater thickness, t, must be used with materials having a lower modulus of elasticity, E. For example:

1. if E>5 million pounds per square inch, then t can be 3 to 5 mils;

2. if 400 thousand pounds per square inch <E<5 million pounds per square inch, then t can be between 5 mils and 10 mils;

3. if 200 thousand pounds per square inch <E<400 thousand pounds per square inch, then t can be between 10 mils and 30 mils.

Typical semi-rigid substrate materials would have E greater than 200 thousand pounds per square inch and t greater than 3 mils.

Bonded to the semi-rigid substrate 12 is a resistive strain sensitive foil 16. Various types of bonding agents, cements, epoxies, or resins can be used to create the bond 14 between the substrate 12 and the foil 16.

A first terminal 18A and a second terminal 18B are operatively connected to the foil 16. These terminals 18A and 18B can be presoldered or bumped to facilitate lead attachment to the strain gage 20.

Also shown in FIG. 1 is an anti-static layer 20. The anti-static layer 20 can be either on the surface of the foil 16 or on the opposite side or on both sides. The anti-static layer 20 provides the advantage of easing the sorting as vibrating bowls can be used in the manufacturing process. The anti-static layer 20 prevents individual strain gages 10 from sticking together in the manufacturing process.

The anti-static layer is preferably copper or solder or other low resistance metal. A metal layer can be used to solder the strain gage 10 to a metal part or other surface 24 instead of using an adhesive such as glue. This can simplify the installation process of the strain gage of the present invention.

Figure 2:
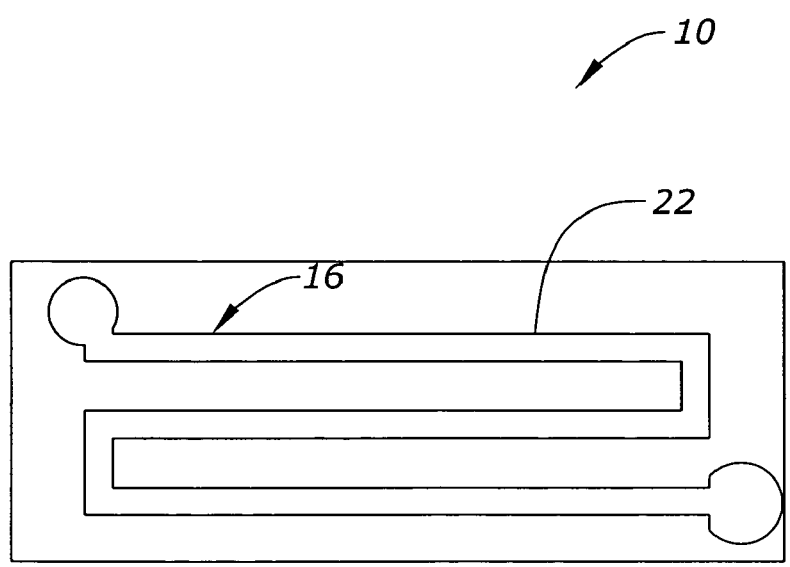
FIG. 2 is a side view of a strain gage according to one embodiment of the invention.

FIG. 2 provides a top view of one embodiment of a strain gage of the present invention. In FIG. 2, the foil 16 has a serpentine pattern 22, although the present invention fully contemplates that other types of patterns can be used in order to arrive at a desired resistance. Preferably the foil pattern 22 provides a resistance of between 50 ohms and 10,000 ohms. The strain factor k that results from the strain gage 10 is essentially the same as if the foil were attached to a very flexible backing of 0.5 mils. Thus, the k is normally about 2 for Cu—Ni and Ni—Cr resistive foils.

An improved strain gage has now been disclosed. The present invention contemplates variations in the type and thickness of the semi-rigid substrate, the type of foil, the resistance of the foil, the type of cement or other bonding agent used to attach the foil, the type of material used for the anti-static layer, and the method to attach the improved strain gage to the structure (adhesively bonded, soldered, etc.). These and other variations and equivalents are within the spirit and scope of the invention.

What is claimed is:

1. A strain gage adapted for providing improved packaging and installation comprising:
   a semi-rigid substrate having a thickness of 3 to 30 mils and a modulus of elasticity of at least 200,000 pounds per square inch to thereby provide sufficient substrate thickness such that the semi-rigid substrate provides for improved packaging and installation;
   a resistive strain sensitive foil bonded directly to the semi-rigid substrate for providing a resistance varying with strain associated with a surface to which the strain gage is attached; and
   a first and a second terminal operatively connected to the resistive strain sensitive foil.

2. The strain gage of claim 1 wherein the resistive strain sensitive foil provides a resistance of between about 50 and about 10,000 ohms.

3. The strain gage of claim 1 further comprising an anti-static layer overlaying a surface of the resistive strain sensitive foil.

4. The strain gage of claim 3 wherein the anti-static layer is adapted for soldering the strain gage to a metal part.

5. The strain gage of claim 1 further comprising an anti-static layer overlaying a surface of the semi-rigid substrate opposite the resistive strain sensitive foil.

6. The strain gage of claim 5 wherein the anti-static layer is metal.

7. The strain gage of claim 5 wherein the anti-static layer is adapted for soldering the strain gage to a metal part.

8. The strain gage of claim 1 wherein the semi-rigid substrate is glass reinforced epoxy.

9. The strain gage of claim 1 wherein the semi-rigid substrate is polyimide.

10. The strain gage of claim 1 wherein the semi-rigid substrate is phenolic.

11. The strain gage of claim 1 wherein the semi-rigid substrate is metal.

12. The strain gage of claim 1 wherein the first and second terminals are presoldered for facilitating lead attachment.

13. The strain gage of claim 1 wherein the strain sensitivity remains greater than 50 percent of the normal strain sensitivity of the resistive material despite the thickness and rigidity of the semi-rigid substrate.

14. The strain gage of claim 1 comprising resistive materials with normal strain sensitivities, k, between 2 and 150.

15. A strain gage, comprising:
   a semi-rigid substrate having a thickness of 3 to 30 mils and a modulus of elasticity of at least 200,000 pounds per square inch;
   a resistive strain sensitive foil bonded to the semi-rigid substrate for providing a resistance varying with strain associated with a surface to which the strain gage is attached;
   a first and second terminal operatively connected to the resistive strain sensitive foil;
   an anti-static layer overlaying a surface of the strain gage;
   the semi-rigid substrate adapting the strain gage for packaging in tape and reel;
   the anti-static layer adapting the strain gage for sorting with vibrating bowls.

16. The strain gage of claim 15 wherein the semi-rigid substrate having a modulus of elasticity of at least 200,000 pounds per square inch.

* * * * *